(12) United States Patent
Umapathy et al.

(10) Patent No.: US 9,892,105 B2
(45) Date of Patent: Feb. 13, 2018

(54) SYSTEMS AND METHODS FOR ANNOTATING MESSAGES WITH REMINDERS

(71) Applicant: GOOGLE INC., Mountain View, CA (US)

(72) Inventors: Vijay Umapathy, Sunnyvale, CA (US); Xander Pollock, Palo Alto, CA (US); Ryan Proch, Mountain View, CA (US); Taylor Kourim, San Jose, CA (US); Liam Asher Segel-Brown, Kitchener (CA)

(73) Assignee: Google LLC, Mountain View, CA (US)

( * ) Notice: Subject to any disclaimer, the term of this patent is extended or adjusted under 35 U.S.C. 154(b) by 393 days.

(21) Appl. No.: 14/472,332

(22) Filed: Aug. 28, 2014

(65) Prior Publication Data

US 2016/0062968 A1    Mar. 3, 2016

(51) Int. Cl.
    *G06F 17/24*      (2006.01)
    *G06F 3/0484*      (2013.01)
    *H04L 12/58*      (2006.01)
    *G06Q 10/06*      (2012.01)
    *G06F 3/0482*      (2013.01)

(52) U.S. Cl.
    CPC .......... *G06F 17/241* (2013.01); *G06F 3/0482* (2013.01); *G06Q 10/06* (2013.01); *H04L 51/046* (2013.01); *H04L 51/063* (2013.01)

(58) Field of Classification Search
    CPC .. G06Q 10/107; G06Q 10/10; G06Q 30/0621; G06F 17/241; G06F 17/30011; G06F 17/30038; G06F 3/04842
See application file for complete search history.

(56) References Cited

U.S. PATENT DOCUMENTS

| | | | | |
|---|---|---|---|---|
| 8,037,146 B2 | 10/2011 | Carr et al. | | |
| 2003/0135659 A1* | 7/2003 | Bellotti | ................ | G06Q 10/107 719/313 |
| 2004/0139391 A1* | 7/2004 | Stumbo | ................ | G06F 17/242 715/232 |
| 2005/0132012 A1* | 6/2005 | Muller | ................ | H04L 51/066 709/206 |
| 2006/0074844 A1* | 4/2006 | Frankel | ................ | G06Q 10/06 |
| 2009/0013043 A1* | 1/2009 | Tan | ................ | G06Q 10/107 709/205 |

(Continued)

*Primary Examiner* — Sang H Kim
(74) *Attorney, Agent, or Firm* — Morgan, Lewis & Bockius LLP

(57) ABSTRACT

A method of annotating an electronic message executes at a computing device having one or more processors and memory. The memory stores one or more programs configured for execution by the one or more processors. The device displays a user interface for an electronic messaging application. The user interface includes a list of messages received by the user, and each displayed message includes a respective message summary that is displayed. The device receives from the user a description of a first task associated with a first message of the displayed messages. The user provides the description using a control in the user interface. The device stores the description as a first annotation associated with the first message and updates the displayed messages in the list of messages. For the first message, the device displays the first annotation as a substitute for the message summary.

20 Claims, 13 Drawing Sheets

Electronic Message List 402

464
☑ Show Tasks

| | | | |
|---|---|---|---|
| 420 → ☐ ☆ 📎 | John Brown | ☐ Edit conference presentation by 6:00 tonight | 11:37 AM |
| 422 → ☐ ☆ | Wang, Ching Li | RE: Product Feature Requests – Hi, I updated the project plan ... | 10:15 AM |
| 424 → ☐ ☆ | bobsmith@mailserver | New Product Catalog – Free samples for the first 100 callers ... | July 31 |
| 426 → ☐ ☆ | Melanie Steinmetz, ... | New sales leads – Please follow up with these people: ... | July 30 |
| 428 → ☐ ☆ 📎 | Jose Gonzales | RE: Interview Schedule – I can meet with you at 4:00 to go over ... | July 30 |
| 430 → ☐ ☆ | HR Department | Updated Vacation Policy – Hello, We have increased the vacation ... | July 30 |

(56) References Cited

U.S. PATENT DOCUMENTS

| | | | | |
|---|---|---|---|---|
| 2009/0216792 A1* | 8/2009 | Grebner | ............... | G06Q 10/103 |
| 2011/0314402 A1* | 12/2011 | Kikin-Gil | ............ | G06Q 10/109 |
| | | | | 715/772 |
| 2013/0326363 A1* | 12/2013 | Meintanis | ......... | G06F 17/30572 |
| | | | | 715/750 |
| 2014/0082521 A1* | 3/2014 | Carolan | .................. | H04L 51/00 |
| | | | | 715/752 |
| 2014/0096034 A1* | 4/2014 | Blair | .................... | G06Q 10/107 |
| | | | | 715/752 |
| 2014/0208325 A1* | 7/2014 | Chen | .................... | G06F 9/4881 |
| | | | | 718/102 |

\* cited by examiner

Electronic Message List 402

| | | |
|---|---|---|
| | | ☑ Show Tasks — 464 |
| 420 → ☐ ☆ | John Brown | ☐ Edit conference presentation by 6:00 tonight — 462 | 11:37 AM |
| 422 → ☐ ☆ | Wang, Ching Li | RE: Product Feature Requests – Hi, I updated the project plan .... | 10:15 AM |
| 424 → ☐ ☆ 📎 | bobsmith@mailserver | New Product Catalog – Free samples for the first 100 callers .... | July 31 |
| 426 → ☐ ☆ | Melanie Steinmetz, ... | New sales leads – Please follow up with these people: .... | July 30 |
| 428 → ☐ ★ 📎 | Jose Gonzales | RE: Interview Schedule – I can meet with you at 4:00 to go over .... | July 30 |
| 430 → ☐ ☆ | HR Department | Updated Vacation Policy – Hello, We have increased the vacation .... | July 30 |

460 points to the checkbox in the John Brown row.

Electronic Message List 402

| | | | 464 ☑ Show Tasks |
|---|---|---|---|
| 420 → ☐ ☆ ⬭ | John Brown | ☐ Edit conference presentation by 6:00 tonight | 11:37 AM |
| 422 → ☐ ☆ | Wang, Ching Li | RE: Product Feature Requests – Hi, I updated the project plan ... | 10:15 AM |
| 424 → ☐ ☆ | bobsmith@mailserver | New Product Catalog – Free samples for the first 100 callers ... | July 31 |
| 426 → ☐ ☆ | Melanie Steinmetz,... | ☐ Contact Hiroshi at ABC Corp. —— 476<br>☐ Contact Rolinka at QRS, Inc. —— 478<br>☐ Contact Roger at XYZ Partners, LLP —— 480 | July 30 |
| 428 → ☐ ★ ⬭ | Jose Gonzales | RE: Interview Schedule – I can meet with you at 4:00 to go over ... | July 30 |
| 430 → ☐ ☆ | HR Department | Updated Vacation Policy – Hello, We have increased the vacation ... | July 30 |

Electronic Message List 402

| | | | | | |
|---|---|---|---|---|---|
| 420 → | ☐ | ☆ | | John Brown | ☐ Edit conference presentation by 6:00 tonight | 11:37 AM |
| 422 → | ☐ | ☆ | | Wang, Ching Li | RE: Product Feature Requests – Hi, I updated the project plan … | 10:15 AM |
| 424 → | ☐ | ☆ | | bobsmith@mailserver | New Product Catalog – Free samples for the first 100 callers … | July 31 |
| 426-1 → | ☐ | ☆ | | Melanie Steinmetz, … | ☐ Contact Hiroshi at ABC Corp. —— 476 | July 30 |
| 426-2 → | ☐ | ☆ | | Melanie Steinmetz, … | ☐ Contact Rolinka at QRS, Inc. —— 478 | July 30 |
| 426-3 → | ☐ | ☆ | | Melanie Steinmetz, … | ☐ Contact Roger at XYZ Partners, LLP —— 480 | July 30 |
| 428 → | ☐ | ★ | | Jose Gonzales | RE: Interview Schedule – I can meet with you at 4:00 to go over … | July 30 |
| 430 → | ☐ | ☆ | | HR Department | Updated Vacation Policy – Hello, We have increased the vacation … | July 30 |

464
☑ Show Tasks 470, 472, 474

Figure 4E

Electronic Message List 402

| | | | |
|---|---|---|---|
| 420 → | ☐ ☆ ⊂⊃ | John Brown | Conference Presentation – Please review the attached presentation ... 416<br>☐ Edit conference presentation by 6:00 tonight —462 | 11:37 AM |
| 422 → | ☐ ☆ | Wang, Ching Li | RE: Product Feature Requests – Hi, I updated the project plan ... | 10:15 AM |
| 424 → | ☐ ☆ | bobsmith@mailserver | New Product Catalog – Free samples for the first 100 callers ... | July 31 |
| 426 → | ☐ ☆ | Melanie Steinmetz, ... | New sales leads – Please follow up with these people: ... | July 30 |
| 428 → | ☐ ★ ⊂⊃ | Jose Gonzales | RE: Interview Schedule – I can meet with you at 4:00 to go over ... | July 30 |
| 430 → | ☐ ☆ | HR Department | Updated Vacation Policy – Hello, We have increased the vacation ... | July 30 |

SYSTEMS AND METHODS FOR ANNOTATING MESSAGES WITH REMINDERS

TECHNICAL FIELD

The disclosure relates generally to electronic messaging applications, and more specifically to annotating messages with task reminders.

BACKGROUND

Electronic messages, such as email, convey various types of information to the recipient. In some instances, a message is purely informational, and may be filed away or deleted after it is read. Some messages result in one or more tasks that the user must perform. Some people leave messages in an inbox pending completion of the associated tasks, or enter associated tasks in a personal calendar or task management system. Managing the tasks associated with messages can be cumbersome or inconvenient.

SUMMARY

Disclosed implementations address the above deficiencies and other problems associated with managing tasks associated with electronic messages. To avoid the burden of maintaining a separate task management system and entering tasks into that system, disclosed implementations enable a user to annotate messages with task reminders. Further, when an electronic message is annotated with one or more tasks, the descriptions of the tasks are displayed in the message list rather than displaying a summary of the electronic message. In this way, a user can easily see which messages have corresponding tasks and what those tasks are.

In accordance with some implementations, a method of annotating an electronic message executes at a computing device having one or more processors and memory. The memory stores one or more programs configured for execution by the one or more processors. The method displays a user interface for an electronic messaging application. In some implementations, the electronic messaging application is an email application. The user interface includes a list of messages received by the user, and each displayed message includes a respective message summary that is displayed. The method receives from the user a description of a first task associated with a first message of the displayed messages. The user provides the description using a control in the user interface. In some implementations, the user can provide the description by selecting from a list of task description options displayed by the control. The method stores the description as a first annotation associated with the first message and updates the displayed messages in the list of messages. The method displays for the first message the first annotation as a substitute for the message summary.

In some instances, the method subsequently receives input from the user to dismiss the first task (e.g., by designating the first task as completed). In this case, the method updates the displayed messages in the list of messages, displaying for the first message the message summary instead of the first annotation.

In some implementations, the user interface includes a task view control that toggles whether message summaries or task annotations are displayed in the list. When the task view control is in a first state, the method displays task descriptions instead of message summaries for each displayed message that has a user-annotated task description, and displays message summaries for each displayed message that has no user-annotated task description. When the task view control is in a second state, the method displays message summaries for all of the displayed messages, regardless of whether any of the displayed messages have user-annotated task descriptions.

In some instances, the user closes the electronic messaging application, and subsequently reopens the electronic messaging application. When the electronic messaging application is reopened, the annotations are not lost. When the method redisplays the list of messages, the first message is displayed with the first annotation as a substitute for the message summary.

In some implementations, a task description is intended to be a short description of all work that a user needs to perform with respect to the message. Even if the task could be subdivided into smaller tasks, there is only one message, and thus a single task description associated with that message.

In some implementations, the user interface allows the user to define more granular tasks. For example, some implementations allow a user to provide one or more descriptions of additional tasks associated with the first message. Each of these additional task descriptions is stored as an additional annotation associated with the first message. The method updates the displayed messages in the list of messages, displaying for the first message the first annotation and the additional annotations as a substitute for the message summary. In some implementations, each of the first annotation and additional annotations is displayed on a separate row in the list of messages, with the respective annotation instead of the message summary of the first message. In other implementations, all or some of the task descriptions are displayed on a single row in the list of messages.

In implementations that support multiple tasks associated with a single message, a user may designate one or more of the first task and additional tasks as completed. When one or more of the first task and additional tasks remain uncompleted, the method displays for the first message the annotations corresponding to the uncompleted tasks. The annotations corresponding to the uncompleted tasks are displayed instead of the message summary of the first message. When the first task and the additional tasks are all completed, the method displays for the first message the message summary of the first message.

Thus methods and systems are provided that enable a user to annotate electronic messages with task descriptions and use the annotations as a task list.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIGS. 4A-4G illustrate aspects of a user interface for annotating electronic messages in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
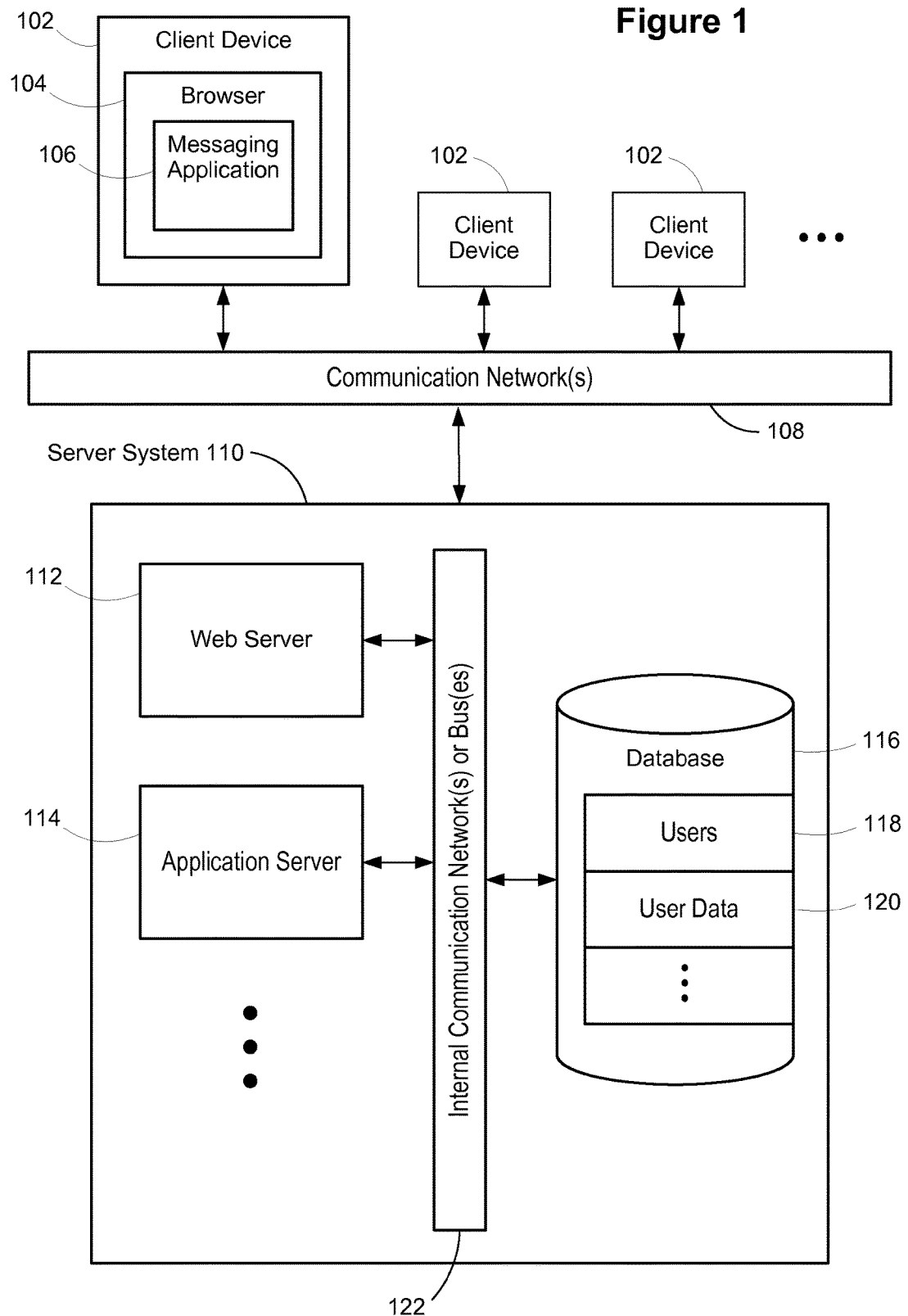
FIG. 1 illustrates a context in which some implementations operate.

FIG. 1 is a block diagram that illustrates the major components of some implementations. The various client devices 102 (also identified herein as computing devices) and servers 300 in a server system 110 communicate over one or more networks 108 (such as the Internet). A client device 102 may be a smart phone, a tablet computer, a laptop computer, a desktop computer, or other computing device that has access to a communication network 108 and can run a messaging application 106. In some implementations, the messaging application runs within a web browser 104.

In some implementations, the server system 110 consists of a single server 300. More commonly, the server system 110 includes a plurality of servers 300. In some implementations, the servers 300 are connected by an internal communication network or bus 122. The server system 110 includes one or more web servers 112, which receive requests from users (e.g., from client devices 102) and return appropriate information, resources, links, and so on. In some implementations, the server system 110 includes one or more application servers 114, which provide various applications, such as a messaging application 106. The server system 110 typically includes one or more databases 116, which store information such as web pages, a user list 118, and various user information 120 (e.g., user names and encrypted passwords, user preferences, and so on).

Figure 2:
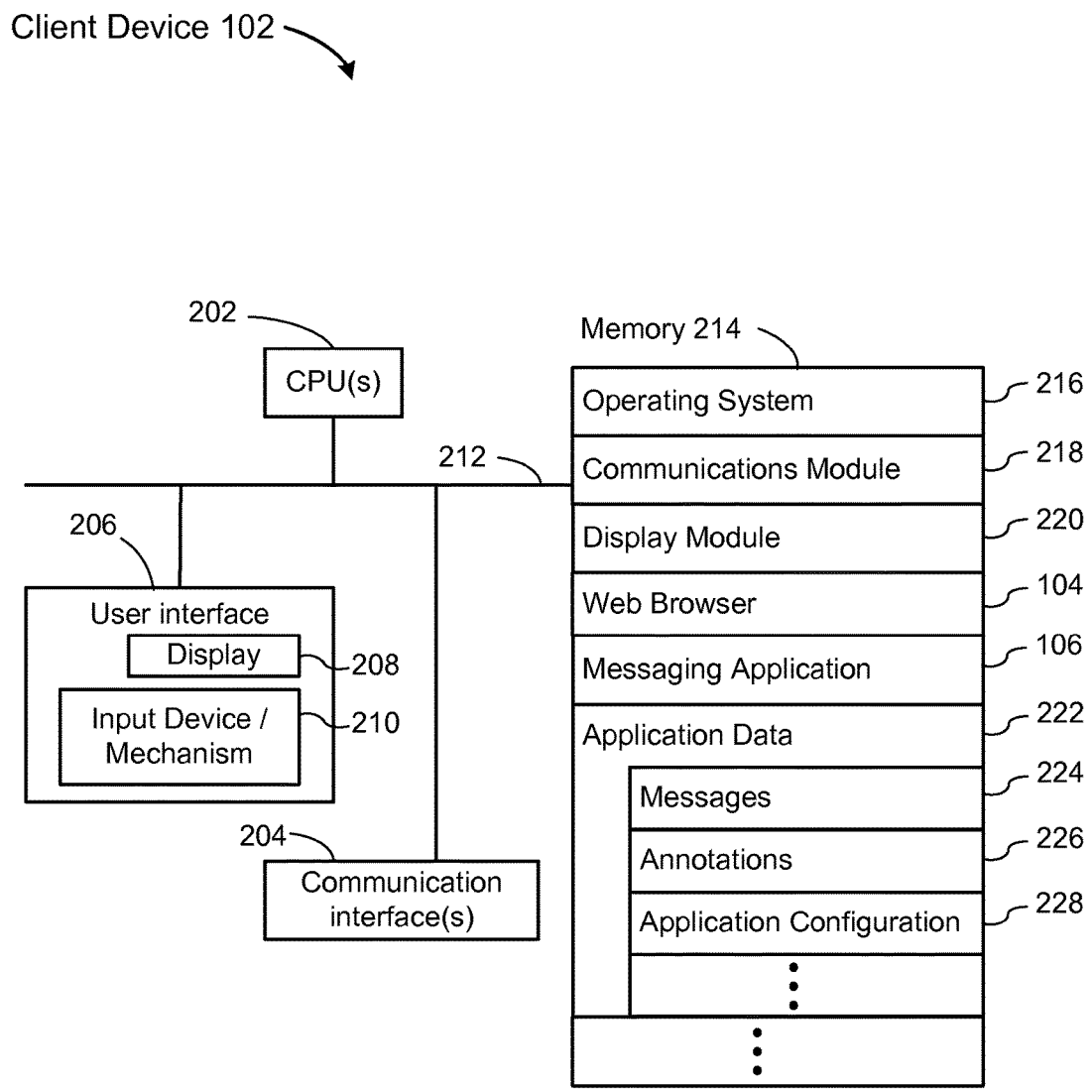
FIG. 2 is a block diagram of a client computing device according to some implementations.

FIG. 2 is a block diagram illustrating a client device 102 that a user uses to access a messaging application 106. A client device is also referred to as a computing device, which may be a tablet computer, a laptop computer, a smart phone, a desktop computer, a PDA, or other computing device than can run a messaging application 106 and has access to a communication network 108. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 108, such as the Internet, other wide area networks, local area networks, metropolitan area networks, and so on;
- a display module 220, which receives input from the one or more input devices 210, and generates user interface elements for display on the display device 208;
- a web browser 104, which enables a user to communicate over a network 108 (such as the Internet) with remote computers or devices;
- a messaging application 106, which enables the user to send and receive electronic messages. In some implementations, the messaging application is an email application. In some implementations, the messaging application is an instant messaging application. In some implementations, the messaging application 106 runs within the web browser 104 as illustrated in FIG. 1. In some implementations, the messaging application 106 runs independently of a web browser 104 (e.g., a desktop application). An example messaging application is illustrated below in FIGS. 4A-4E; and
- application data 222, which is used by the messaging application 106. The application data includes messages 224 (e.g., email messages or instant messages), as well as annotations 226 for some of the messages. The application data 222 may include configuration data 228, such as user preferences, user history, or the state of configuration options.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
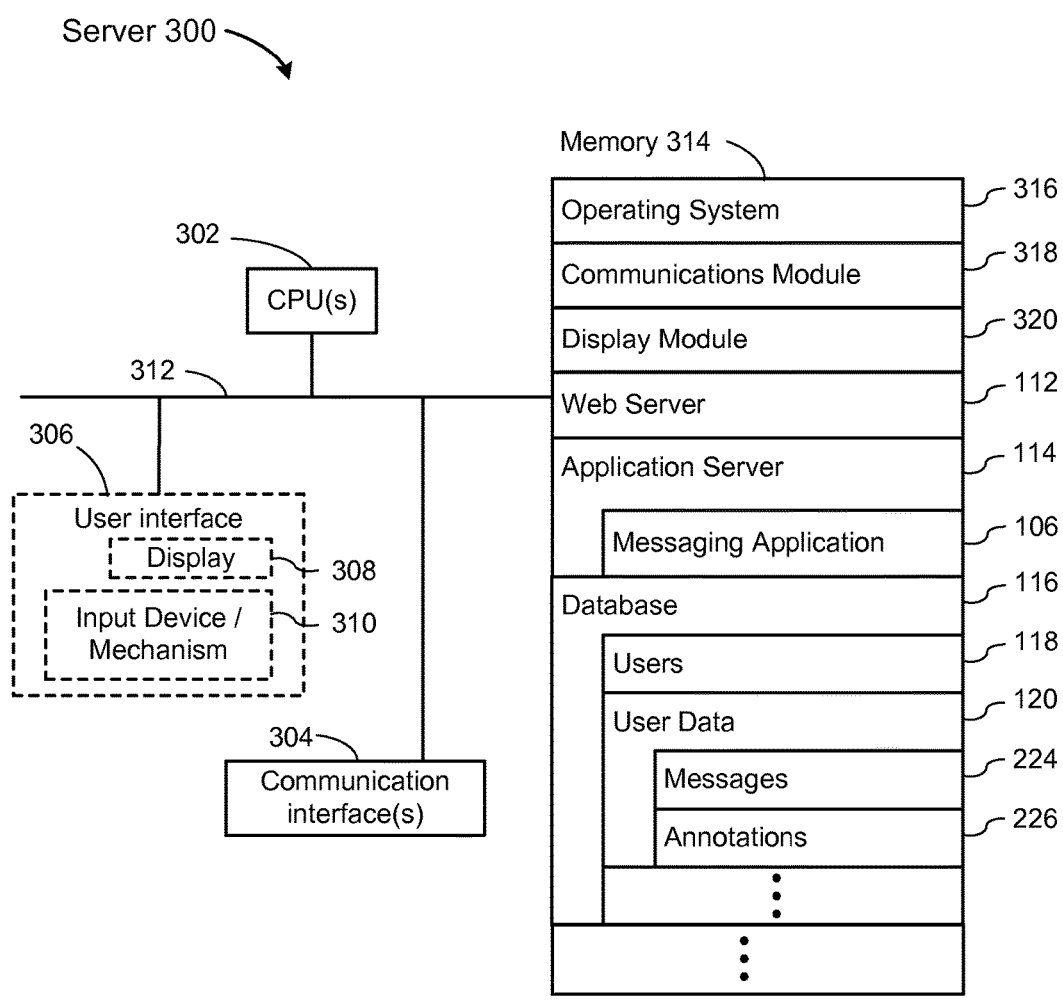
FIG. 3 is a block diagram of a server according to some implementations.

FIG. 3 is a block diagram illustrating a server 300 that may be used in a server system 110. A typical server system includes many individual servers 300, which may be hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 122, or other communication networks 108, such as the Internet, other wide area networks, local area networks, metropolitan area networks, and so on;
- a display module 320, which receives input from one or more input devices 310, and generates user interface elements for display on a display device 308;
- one or more web servers 112, which receive requests from the client device 102, and return responsive web pages, resources, or links. In some implementations, each request is logged in the database 116;
- one or more application servers 114, which provide various applications (such as an email or other messaging application 106) to the client devices 102. In some instances, applications are provided as a set of web pages, which are delivered to the client devices 102 and displayed in a web browser 104. The web pages are delivered as needed or requested. In some instances, an application is delivered to a client device 102 as a download, which is installed and run from the client device 102 outside of a web browser 104;
- one or more databases 116, which store various data used by the modules or programs identified above. In some implementations, the database 116 includes a list of authorized users, which may include user names, encrypted passwords, and other relevant information about each user. The database 116 also stores user specific data 120 that is used by one or more of the applications provided by the application server. For example, some implementations store the electronic messages 224 for each user. When a user has annotated an electronic message, the annotations 226 are also stored in the database 116.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a messaging application may be shared between a client device 102 and a server system 110. In some implementations, after the messaging application is installed on a client device 102, the majority of the subsequent processing occurs on the client device. For example, annotations may be stored solely at the client device, and not on a server 300. In other implementations, the majority of the processing and data storage occurs at a server 300, and the client device 102 uses a web browser 104 to view and interact with the data. For example, the annotations may be stored only at the server system 110. One of skill in the art recognizes that various allocations of functionality between the client device 102 and the server system 110 are possible, and some implementations support multiple configurations (e.g., based on user selection).

Figure 4A:
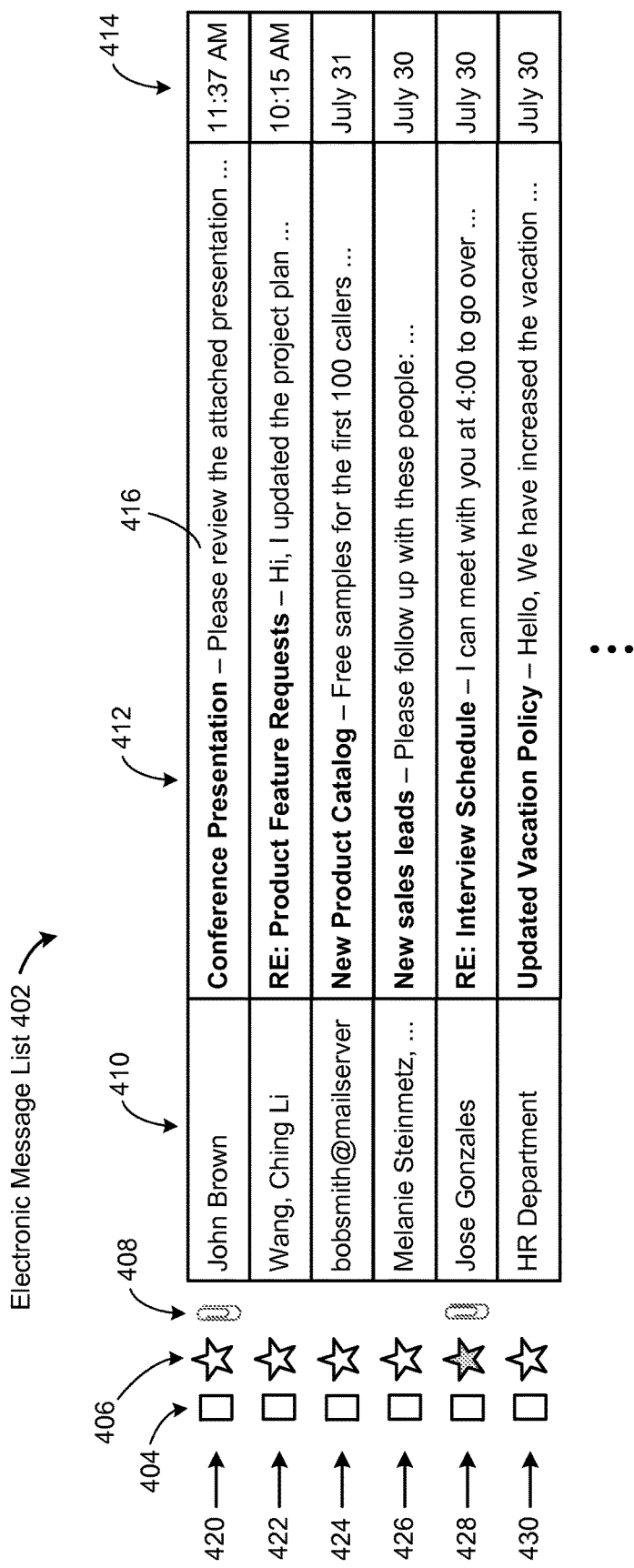

FIGS. 4A-4G illustrate features of a messaging application that supports annotations in accordance with some implementations. FIG. 4A illustrates an electronic message list 402, which may be displayed as part of an electronic messaging application (e.g., an email application). In this example, each row in the list represents a separate message (or a conversation or cluster, including two or more messages). The tag column 404 includes boxes that may be used to tag messages that will be acted on jointly. For example, a user may tag multiple messages that will be deleted or moved to a same folder. The star column 406 enables a user to identify important messages. Some implementations allow a user to manually highlight a star in a row to indicate the importance of the row, as illustrated in the fifth row 428. In some implementations, a star is highlighted based on the sender's designation of the message as important. In some implementations, a user may specify rules for which messages should be automatically tagged as important. In some implementations, when a message is starred, the message summary 416 is always displayed in the message list 402, even when the message has an associated task.

Some implementations include an attachment column 408, which identifies which messages include one or more attachments (e.g., the first message 420 and the fifth message 428 in the list 402). In some implementations, a paperclip icon is used to indicate the presence of an attachment.

In some implementations, the displayed list 402 includes a sender column 410, which identifies the sender of each message. As illustrated in FIG. 4A, the senders may be identified in various ways. For example, the sender of the third message 424 is identified only by an email address, the sender of the sixth message 430 is the "HR Department," and the other senders include one or more names of individual people. In some implementations, the number of names displayed depends on the size of the sender column 410, and additional names may be indicated by an ellipsis, as illustrated by the fourth message 426. In some implementations, the formatting of names can depend on how the name was formatted in the message received. For example, in the first message 420 and the fifth message 428, the names appear in first name/last name order, whereas in the second message 422, the last name appears first.

The message list 402 includes a message summary column 412, which may include the subject line of each message as well as an initial portion of each message, as illustrated by the first message summary 416. In some implementations, the message summary includes only the subject line of each message. In some implementations, the message summary may include additional information.

In some implementations, the message list 402 includes a date/time column 414, which specifies the date and/or time that each message was received. As illustrated in FIG. 4A, some implementations display the received time for messages received on the current day and display the received date for messages received earlier than the current day. Typically, the messages are displayed in reverse chronological order, but implementations typically allow a user to sort the messages in other ways (e.g., sort by sender).

A display device 208 is inherently limited in size, so the number of messages displayed in the message list 402 is necessarily limited. Scrolling may be necessary for a user to get to a desired message. If the number of messages in the message list is small enough, all of the messages may be able to be displayed.

Figure 4B:
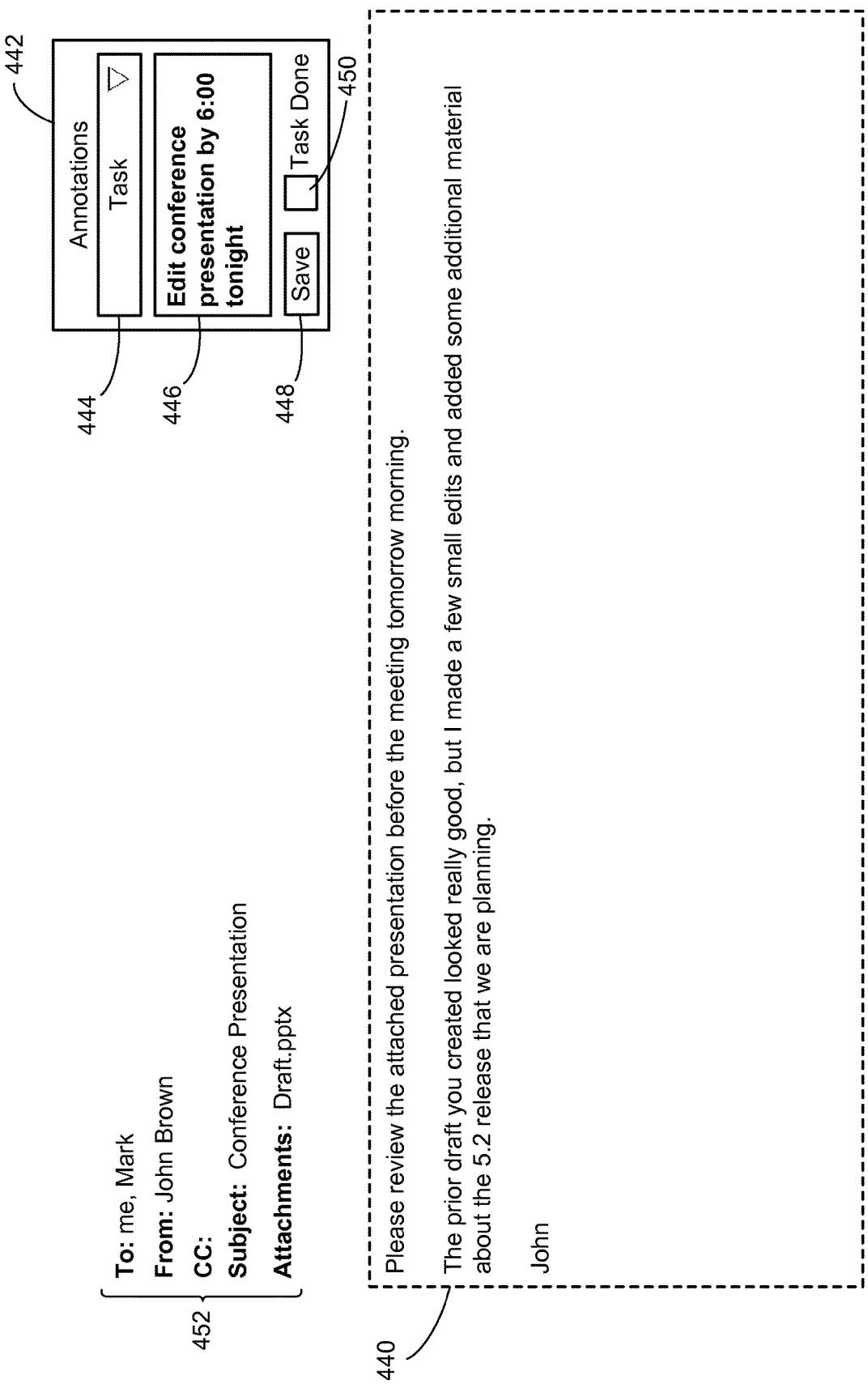

FIG. 4B illustrates a display of a single electronic message. For example, a user may select a message from the message list 402 in FIG. 4A in various ways (e.g., double clicking, tapping, using a menu item or toolbar icon, etc.), and the selected message is shown as in FIG. 4B. This example interface for a message includes a header area 452, and a message body 440. The message header identifies the sender, the recipients, any carbon copy recipients (and optionally blind carbon copy recipients), the subject line, and a list of attachments. Some implementations include other items in the header 452 as well, such as the date/time the message was sent or received.

The sample user interface in FIG. 4B also includes an annotation region 442. The example annotation box 442 in FIG. 4B enables a user to create a single annotation for a message 224, but some implementations enable a user to create two or more annotations for the same message 224. Some implementations provide an annotation type control 444, enabling the user to specify a type for the annotation. In this example, the annotation type is "task." Some implementations support a plurality of different annotation types, with each type having a different set of characteristics. For example, some implementations support an annotation type for "notes," which are not tasks that the user needs to perform.

The annotation content box 446 is where the user enters an annotation. In this example, the user has entered "Edit conference presentation by 6:00 tonight." Some implementations allow a user to specify a date/time for a task in a separate field, which can be tied to a calendar. The annotation box 442 also includes a save button 448, so the user can explicitly chose to save an annotation. In other implementations, annotations are saved implicitly, so the user does not need to issue an explicit save command. In some implementations, there is a completion control 450 for the user to designate when the task is complete. Some implementations refer to this as a "remove" or "dismiss" control 450 because a task is sometimes removed without being completed (e.g., deleting a task that was input in error or dismissing a task because it is not important). As illustrated below in FIG. 4C, some implementations also allow a user to specify completion (or dismissal) of a task from the message list 402.

Once the user has created a task annotation for a message, the message list displays the annotation rather than the message summary. This is illustrated in FIG. 4C. In this example, the user has entered and saved the annotation illustrated in FIG. 4B and returned to the message list 402. Because there is a pending task for the first message 420, the annotation 462 displays instead of the previous message summary 416. In some implementations, a task completion control 460 (also referred to as a task dismissal control 460) is located next to the task annotation 462. This enables a user to dismiss a task (e.g., as complete) without opening up the message. In addition, the task completion control 460 visually identifies the first message 420 as having a task that needs to be completed. Some implementations use one or more other visual cues to distinguish between a task and a regular message. For example, some implementations use a different background color or shading for tasks. Some implementations support multiple task priorities, and use different shading to indicate the task priorities. For example, some implementations use no shading for regular messages, yellow shading for regular tasks, and a shade of red for high priority tasks. Once the task is designated as completed (e.g., using the task completion control 460 or the completion control 450), the display returns to showing the message summary 416 as illustrated in FIG. 4A.

Some implementations include a task display control 464, which determines whether tasks are displayed at all. In the example in FIG. 4C, the control 464 is set to a first state, in which pending tasks have their task annotations displayed (e.g., for the first message 420). When the task display control is in a second state (e.g., unchecked), tasks are not displayed. In this second state, the display would return to that shown in FIG. 4A, even though there is a pending task for the first message 420. This provides a quick way to toggle between seeing tasks and seeing only the electronic messages. In some implementations, the task display control has more than two states. For example, some implementations support a third state for the task display control in which the display is filtered to just the messages with tasks, and the task annotations are displayed. Some implementations store the state of the task display control 464 as part of the application configuration data 228.

FIGS. 4D and 4E illustrate two implementations that support messages with two or more annotations. In these two examples, the user has identified three tasks 476, 478, and 480 associated with the fourth message 426. Each of the tasks has a corresponding task completion control (i.e., the controls 470, 472, and 474). In the implementation illustrated in FIG. 4D, all three tasks are displayed on a single row 426. If one or two of the tasks are completed, the completed tasks disappear and the remaining tasks are displayed. When all three tasks are completed, the original message summary is displayed.

In the implementation illustrated in FIG. 4E, the three tasks are displayed on separate rows 426-1, 426-2, and 426-3 in the message list. As in FIG. 4D, if one or two of the tasks are marked as completed, the corresponding rows disappear from the message list. When the last task is completed, the task annotation and corresponding task completion control are replaced by the original message summary.

FIG. 4F illustrates an alternative implementation in which task descriptions are displayed in addition to the message summaries. After a user has created an annotation as illustrated in FIG. 4B, both the message summary 416 and the annotation 462 are displayed. In some implementations, a task dismissal control 460 is displayed adjacent to the task description 462, enabling the user to dismiss the task quickly. As noted earlier, a task may be dismissed because it has been completed or for various other reasons (e.g., the user does not have time to complete the task soon, and does not want the task description cluttering the message list 402 in the meantime).

Figure 4G:
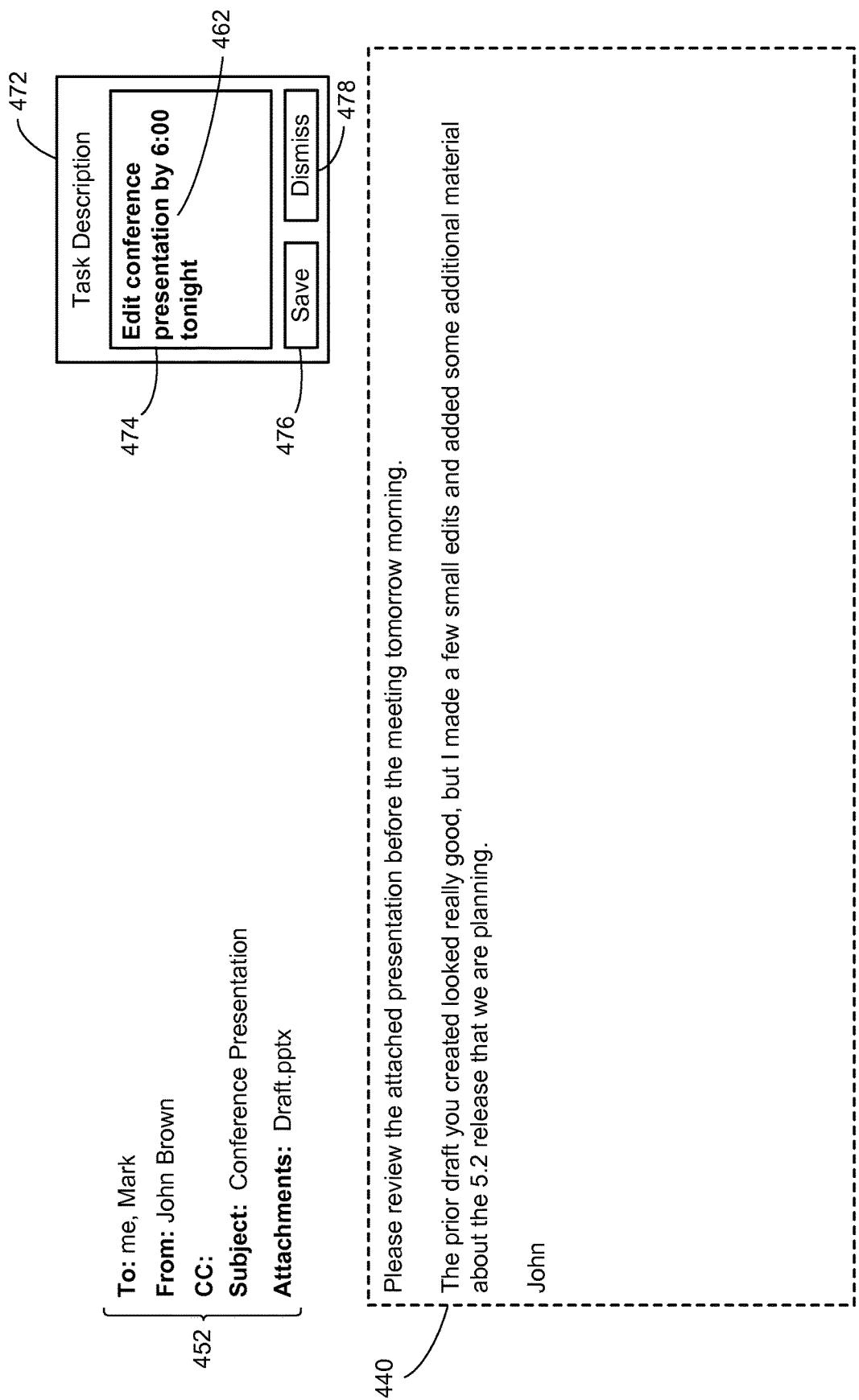

FIG. 4G illustrates an alternative implementation of a user interface that enables a user to provide a task description corresponding to a message. In this implementation, the user interface includes a task description box 472, which allows the user to enter or edit a task description that describes the message (e.g., what the user needs to do). The content box 474 includes the current text that will be displayed as the message summary when viewing the message list 402. This allows a user to read a message one time and summarize what the user needs to do. The task description box 472 also includes a save button 476, which allows the user to save changes, and a dismiss button 478, which removes the description (thus returning the message summary text to its default state). In FIG. 4G, the user has set the text to the task description 462. Once the user saves the task description, the message list displays as shown in FIG. 4C, with the task description 462 replacing the previous message summary 416. In some implementations, the message list includes a box or button 460, which acts as a dismiss button in this context.

Figure 5A:
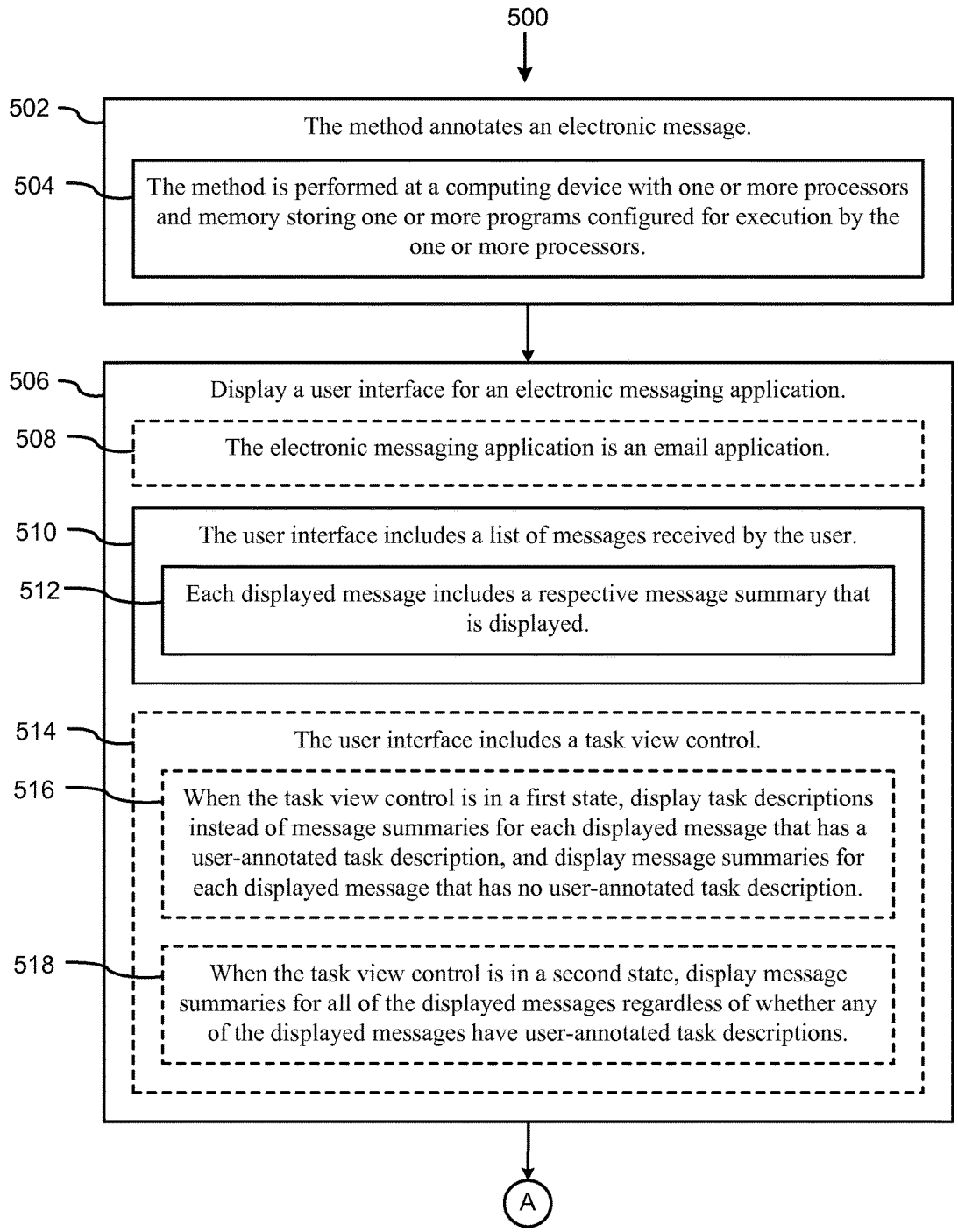
FIGS. 5A-5C provide a flowchart of a process, performed at a client computing device, for annotating electronic messages according to some implementations.
Figure 5B:
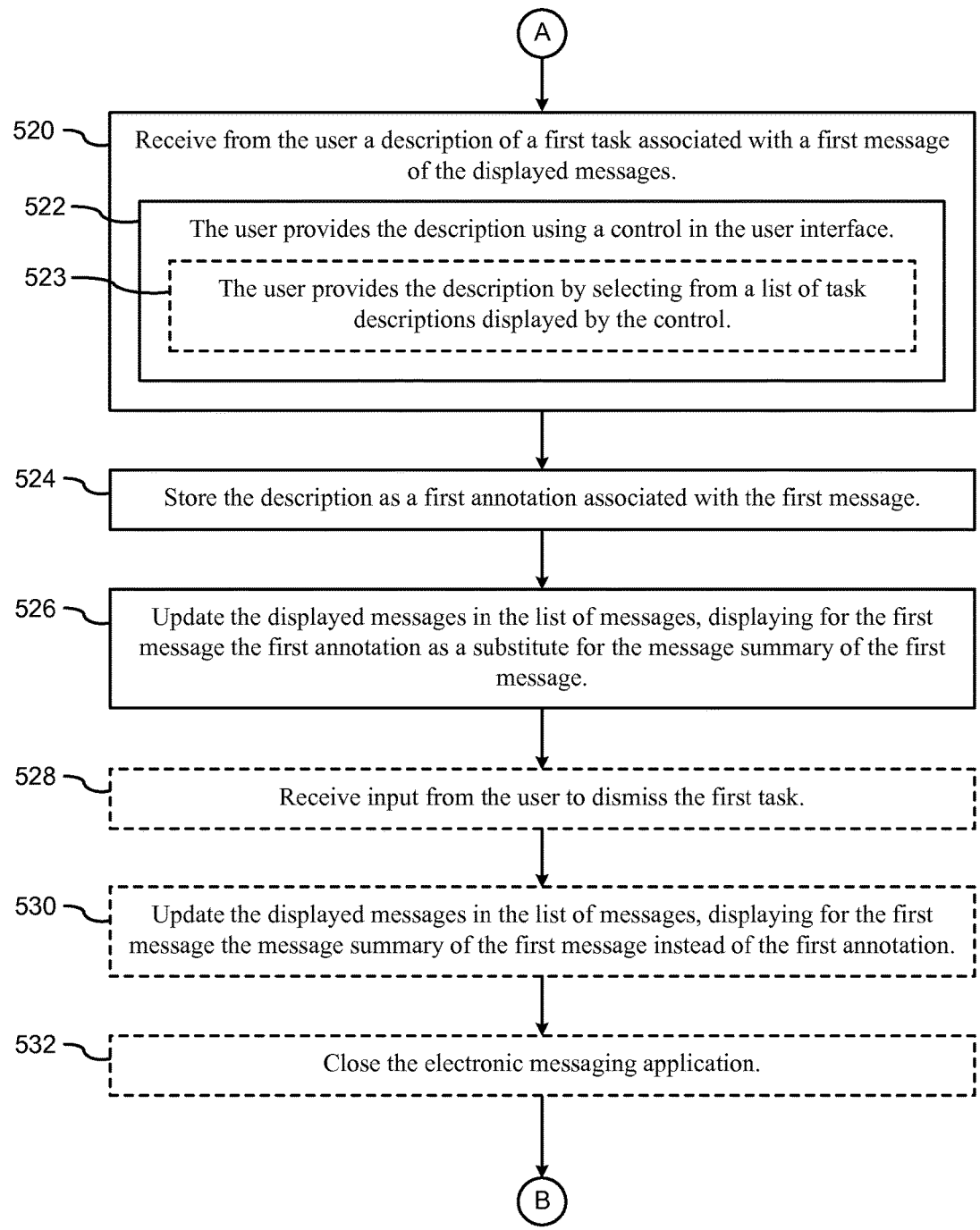
Figure 5C:
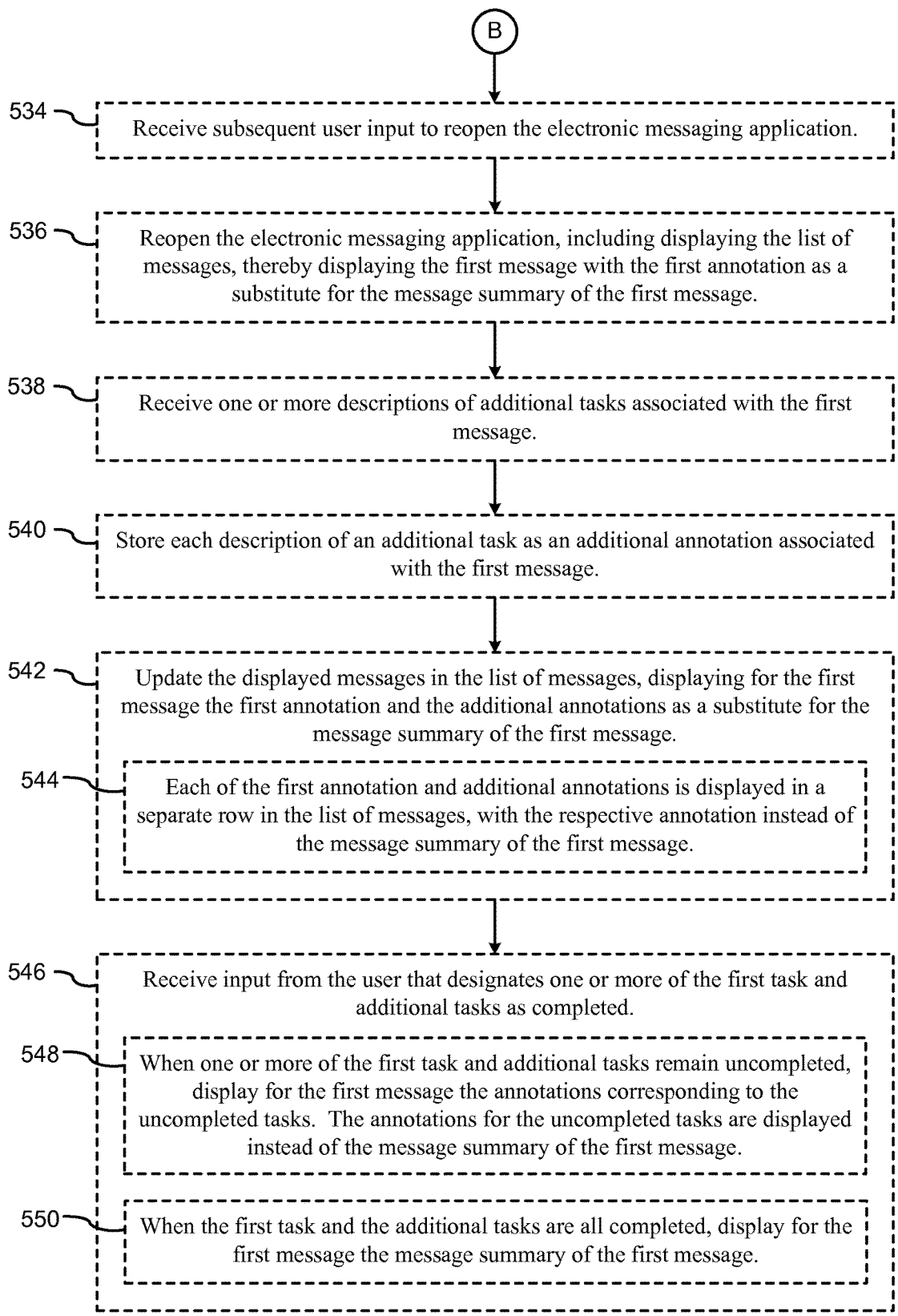

FIGS. 5A-5C provide a flowchart of a process 500, performed by a computing device, for annotating (502) an electronic message. The method is performed (504) at a computing device 102 having one or more processors and memory. The memory stores (504) one or more programs configured for execution by the one or more processors.

A user interface for an electronic messaging application is displayed (506). In some implementations, the electronic messaging application is (508) an email application. In some implementations, the electronic messaging application is an instant messaging application. The user interface includes (510) a list of messages received by the user, as illustrated in FIG. 4A. Each displayed message includes (512) a respective message summary that is displayed, such as the message summary 416 for the first message 420 in FIG. 4A.

In some implementations, the user interface includes (514) a task view control 464, as illustrated in FIG. 4C. When the task view control 464 is in a first state, task descriptions are displayed (516) instead of message summaries for each displayed message that has a user-annotated task description, and message summaries are displayed (516) for each displayed message that has no user-annotated task description. When the task view control is in a second state, message summaries are displayed (518) for all of the displayed messages regardless of whether any of the displayed messages have user-annotated task descriptions.

A description of a first task associated with a first message is received (520) from the user, as illustrated in FIG. 4B above. The user provides (522) the description using a control in the user interface, such as the annotation content box 446 in FIG. 4B. In some implementations, the user provides the description by selecting (523) from a list of task descriptions displayed by the control. For example, the control may generate task description options based on previous task descriptions entered by the user, or a set of predefined task descriptions. In some implementations, the user may select one of the presented task description options or enter a new description from scratch. The description is stored (524) as a first annotation 226 associated with the first message. The displayed messages in the list of messages are then updated (526), displaying for the first message the first annotation as a substitute for the message summary of the first message. This was illustrated above in FIG. 4C In some instances, the user provides (528) input to dismiss the first task (e.g., using the task completion control 460 or the completion control 450). In some instances, the first task is dismissed because it has been completed. In response, the displayed messages in the list of messages are updated (530), displaying for the first message the message summary of the first message instead of the first annotation. For example, going from FIG. 4C back to FIG. 4A when the task for the first message 420 is completed.

Because task annotations and the status of those annotations are stored (e.g., in the database 116), closing the messaging application does not result in the loss of that information. For example, in some instances, a user closes (532) the messaging application 106, and subsequently reopens (534) the messaging application 106. When the messaging application reopens (536), the list of messages 402 is displayed (536), including displaying the first message with the first annotation as a substitute for the message summary of the first message. In some instances, the first message may not be displayed in the message list when the messaging application reopens because the messages are displayed in a specific order and by default the displayed messages are those at the beginning of the list. For example, if the message list can only display 20 messages, and the message with the annotation is the 25th message in reverse chronological order, then the 25th message and its task annotation are not initially displayed. In some implementations, the viewing state in the message list is stored (e.g., as part of the application configuration 228), and when the application reopens, the message list automatically scrolls to the same position.

In some instances, a user provides one or more additional task descriptions for a single message, as illustrated in FIGS. 4D and 4E. The one or more additional task descriptions associated with the first message are received (538) from the user and each description of an additional task is stored (540) as an additional annotation associated with the first message. In this case, the displayed messages in the list of messages is updated (542) to display for the first message the first annotation and the additional annotations as a substitute for the message summary of the first message, as illustrated in FIGS. 4D and 4E. In some implementations, each of the first annotation and additional annotations is displayed (544) in a separate row in the list of messages, with the respective annotation instead of the message summary of the first message. This is illustrated above in FIG. 4E.

When there is a single annotation for a message, the display of the message returns to normal (i.e., showing the message summary) when the task is designated as completed. When there are multiple tasks associated with a single message, the process is a little different. Consider the case where there are multiple pending tasks for a single message, as illustrated in FIG. 4D or 4E. At some point the user designates (546) one or more of the tasks as completed. When one or more of the tasks remain (548) uncompleted, the user interface displays (548) for the first message the annotations corresponding to the uncompleted tasks. The annotations for the uncompleted tasks are displayed (548) instead of the message summary of the first message. When the tasks are all completed (550), the user interface displays (550) for the first message the message summary of the first message.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method of annotating an electronic message, comprising:
   at a computing device having one or more processors and memory storing one or more programs configured for execution by the one or more processors:
   displaying a user interface for an electronic messaging application, wherein the user interface includes a list of messages received by a user, and each displayed message includes a respective message summary comprising (i) a subject line of the displayed message and (ii) additional context information including an initial portion of the displayed message;
   receiving from the user a description of a first task associated with a first message of the displayed messages, wherein the user provides the description, in the user interface, using an annotation box, which allows the user to edit the description and to specify a type for the description;
   designating the description as a first annotation associated with the first message using the annotation box in the user interface, allowing the user to save the first task associated with the first message of the displayed messages; and
   updating the displayed messages in the list of messages, including replacing the message summary of the first message with the first annotation and a corresponding visual cue.

2. The method of claim 1, further comprising:
   receiving input from the user to dismiss the first task; and
   updating the displayed messages in the list of messages, including replacing the first annotation and the corresponding visual cue with the message summary of the first message.

3. The method of claim 1, wherein the user interface includes a task view control, the method further comprising:
   when the task view control is in a first state, displaying annotations and corresponding visual cues instead of message summaries for each displayed message associated with an annotation, and displaying message summaries for each displayed message not associated with an annotation; and
   when the task view control is in a second state, displaying message summaries for all of the displayed messages, regardless of whether any of the displayed messages is associated with an annotation.

4. The method of claim 1, further comprising;
   closing the electronic messaging application;
   receiving subsequent user input to reopen the electronic messaging application; and
   reopening the electronic messaging application, including displaying the list of messages, thereby replacing the message summary of the first message with the first annotation and the corresponding visual cue.

5. The method of claim 1, further comprising:
   receiving one or more descriptions of additional tasks associated with the first message;
   storing each description of an additional task as an additional annotation associated with the first message; and
   updating the displayed messages in the list of messages, including replacing the message summary of the first message with the first annotation and the additional annotations, each with a corresponding visual cue.

6. The method of claim 5, wherein each of the first annotation and additional annotations, as well as the corresponding visual cues, is displayed on a separate row in the list of messages, with the respective annotation and corresponding visual cue replacing the message summary of the first message.

7. The method of claim 5, further comprising:
   receiving input from the user that designates one or more of the first task and additional tasks as completed;
   when one or more of the first task and additional tasks remain uncompleted, displaying for the first message the annotations and corresponding visual cues corresponding to the uncompleted tasks, including replacing the message summary of the first message with the annotations and corresponding visual cues corresponding to the uncompleted tasks; and
   when the first task and the additional tasks are all completed, displaying for the first message the message summary of the first message, including replacing the annotations and corresponding visual cues corresponding to the completed tasks with the message summary of the first message.

8. The method of claim 1, wherein the user provides the description by selecting from a list of task descriptions displayed by the annotation box.

9. The method of claim 1, wherein the corresponding visual cue is a task completion control.

10. A computing device, comprising:
    one or more processors;
    memory; and one or more programs stored in the memory configured for execution by the one or more processors, the one or more programs comprising instructions for:

displaying a user interface for an electronic messaging application, wherein the user interface includes a list of messages received by a user, and each displayed message includes a respective message summary comprising (i) a subject line of the displayed message and (ii) additional context information including an initial portion of the displayed message;

receiving from the user a description of a first task associated with a first message of the displayed messages, wherein the user provides the description, in the user interface, using an annotation box, which allows the user to edit the description and to specify a type for the description;

designating the description as a first annotation associated with the first message using the annotation box in the user interface, allowing the user to save the first task associated with the first message of the displayed messages; and updating the displayed messages in the list of messages, including replacing the message summary of the first message with the first annotation and a corresponding visual cue.

11. The computing device of claim 10, wherein the one or more programs further comprise instructions for:

receiving input from the user to dismiss the first task; and updating the displayed messages in the list of messages, including replacing the first annotation and the corresponding visual cue with the message summary of the first message.

12. The computing device of claim 10, wherein the user interface includes a task view control, and the one or more programs further comprise instructions for:

when the task view control is in a first state, displaying annotations and corresponding visual cues instead of message summaries for each displayed message associated with an annotation, and displaying message summaries for each displayed message not associated with an annotation; and when the task view control is in a second state, displaying message summaries for all of the displayed messages, regardless of whether any of the displayed messages is associated with an annotation.

13. The computing device of claim 10, wherein the one or more programs further comprise instructions for:

closing the electronic messaging application;

receiving subsequent user input to reopen the electronic messaging application; and reopening the electronic messaging application, including displaying the list of messages, thereby replacing the message summary of the first message with the first annotation and the corresponding visual cue.

14. The computing device of claim 10, wherein the one or more programs further comprise instructions for:

receiving one or more descriptions of additional tasks associated with the first message;

storing each description of an additional task as an additional annotation associated with the first message; and updating the displayed messages in the list of messages, including replacing the message summary of the first message with the first annotation and the additional annotations, each with a corresponding visual cue.

15. The computing device of claim 14, wherein each of the first annotation and additional annotations, as well as the corresponding visual cues, is displayed on a separate row in the list of messages, with the respective annotation and corresponding visual cue replacing the message summary of the first message.

16. The computing device of claim 14, wherein the one or more programs further comprise instructions for:

receiving input from the user that designates one or more of the first task and additional tasks as completed;

when one or more of the first task and additional tasks remain uncompleted, displaying for the first message the annotations and corresponding visual cues corresponding to the uncompleted tasks, including replacing the message summary of the first message with the annotations and corresponding visual cues corresponding to the uncompleted tasks; and when the first task and the additional tasks are all completed, displaying for the first message the message summary of the first message, including replacing the annotations and corresponding visual cues corresponding to the completed tasks with the message summary of the first message.

17. A non-transitory computer readable storage medium storing one or more programs configured for execution by a computing device having one or more processors and memory, the one or more programs comprising instructions for:

displaying a user interface for an electronic messaging application, wherein the user interface includes a list of messages received by a user, and each displayed message includes a respective message summary comprising (i) a subject line of the displayed message and (ii) additional context information including an initial portion of the displayed message;

receiving from the user a description of a first task associated with a first message of the displayed messages, wherein the user provides the description, in the user interface, using an annotation box, which allows the user to edit the description and to specify a type for the description;

designating the description as a first annotation associated with the first message using the annotation box in the user interface, allowing the user to save the first task associated with the first message of the displayed messages; and updating the displayed messages in the list of messages, including replacing the message summary of the first message with the first annotation and a corresponding visual cue.

18. The computer readable storage medium of claim 17, wherein the one or more programs further comprise instructions for:

receiving input from the user to dismiss the first task; and updating the displayed messages in the list of messages, including replacing the first annotation and the corresponding visual cue with the message summary of the first message.

19. The computer readable storage medium of claim 17, wherein the user interface includes a task view control, and the one or more programs further comprise instructions for:

when the task view control is in a first state, displaying annotations and corresponding visual cues instead of message summaries for each displayed message associated with an annotation, and displaying message summaries for each displayed message not associated with an annotation; and when the task view control is in a second state, displaying message summaries for all of the displayed messages, regardless of whether any of the displayed messages is associated with an annotation.

20. The computer readable storage medium of claim 17, wherein the one or more programs further comprise instructions for:
- receiving one or more descriptions of additional tasks associated with the first message;
- storing each description of an additional task as an additional annotation associated with the first message; and
- updating the displayed messages in the list of messages, including replacing the message summary of the first message with the first annotation and the additional annotations, each with a corresponding visual cue.

\* \* \* \* \*